(12) United States Patent
Mudawar

(10) Patent No.: US 9,170,811 B2
(45) Date of Patent: Oct. 27, 2015

(54) STRUCTURED CONTROL INSTRUCTION FETCH UNIT

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventor: Muhamed Fawzi Mudawar, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 554 days.

(21) Appl. No.: 13/737,894

(22) Filed: Jan. 9, 2013

(65) Prior Publication Data

US 2014/0195781 A1 Jul. 10, 2014

(51) Int. Cl.
*G06F 9/30* (2006.01)
*G06F 9/38* (2006.01)

(52) U.S. Cl.
CPC ............. *G06F 9/30* (2013.01); *G06F 9/3017* (2013.01); *G06F 9/30149* (2013.01); *G06F 9/3802* (2013.01); *G06F 9/3814* (2013.01)

(58) Field of Classification Search
CPC ... G06F 9/3802; G06F 9/3851; G06F 9/3814; G06F 9/3017; G06F 9/30149
See application file for complete search history.

(56) References Cited

U.S. PATENT DOCUMENTS

| | | | | |
|---|---|---|---|---|
| 4,463,422 A | * | 7/1984 | Storer | G06F 9/4426 712/241 |
| 5,960,210 A | | 9/1999 | Jin | |
| 7,689,735 B2 | | 3/2010 | Wezelenburg et al. | |
| 2002/0010852 A1 | | 1/2002 | Arnold et al. | |
| 2008/0155210 A1 | * | 6/2008 | Taunton | G06F 9/30036 711/161 |
| 2010/0122066 A1 | | 5/2010 | Fischer | |

* cited by examiner

*Primary Examiner* — Farley Abad
(74) *Attorney, Agent, or Firm* — Richard C. Litman

(57) ABSTRACT

The structured control instruction fetch unit is a structured instruction stream controller that processes expand (XP), expand register indirect (XPR), loop (LOOP), and break (BRK) instructions for structured control. The fetch unit processes stop bits that mark the end of instruction blocks. Any instruction can be marked with a stop bit to indicate that it is the last one in an instruction block. All instructions are encoded with a predicate to reduce the use of control instructions and to simplify the control. A control stack guides instruction fetching by storing return addresses, loop block addresses, loop predicates, and loop counters. Control instructions and stop bits manage operation of the control stack. An instruction unit feeds execution units and includes a set-associative instruction cache, a control stack, an instruction buffer that decouples instruction fetching from execution, instruction decoders, and program counter (PC) control logic.

17 Claims, 5 Drawing Sheets

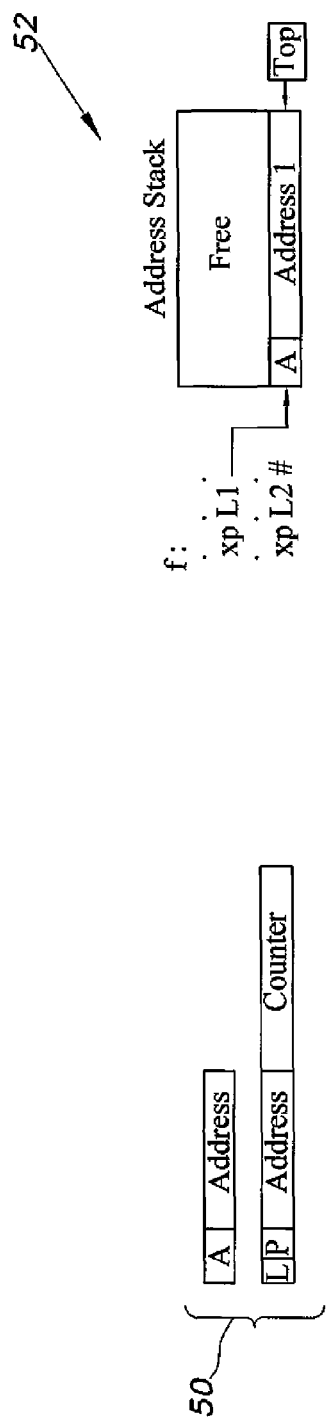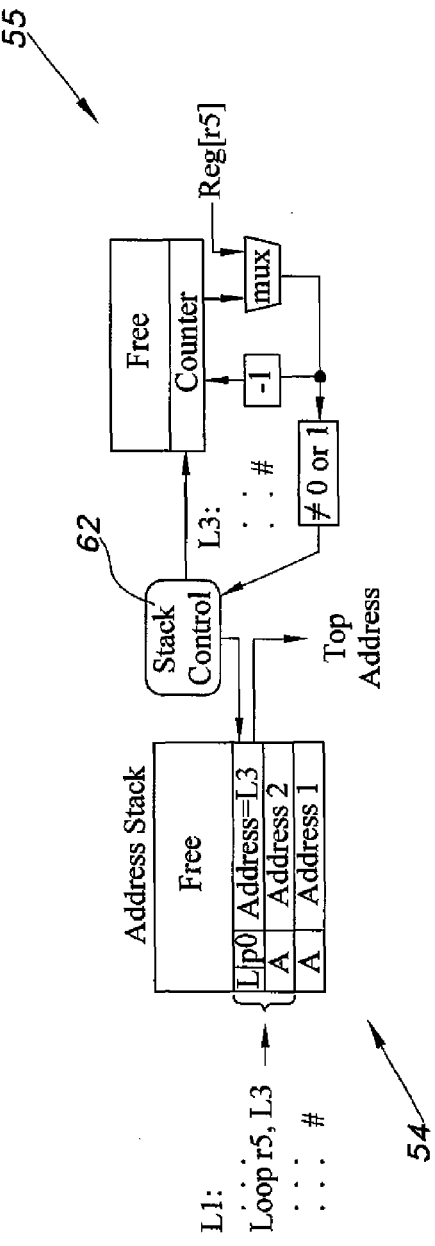
Fig. 5A
Fig. 5B
Fig. 5C

STRUCTURED CONTROL INSTRUCTION FETCH UNIT

BACKGROUND OF THE INVENTION

1. Field of the Invention

The present invention relates to data processing systems, and particularly to a structured control instruction fetch unit that feeds structured control program instructions to a processor for execution.

2. Description of the Related Art

The problem of accessing instructions that are stored in a data store, such as memory, and providing them to a data processor has been addressed in a variety of ways. Dedicated local memory is fast, can provide a high bandwidth, is power efficient and readily available, but is costly in area. By contrast, on-die shared and/or arbitrated memory consumes more power and may not always be available or satisfy peak bandwidth requirements, but the cost of implementation is reduced. Off-chip memory is the cheapest, but suffers the largest penalty in power consumption, access latency and available bandwidth. Any limitation in memory access performance, either due to latency or bandwidth limitations, also inflicts a penalty in processor efficiency, as the processor will stall when the required instruction is not available. With respect to shared memory access, latency, bandwidth, and power consumption can be mitigated by providing an intermediate data store. In some systems, a program instruction cache is provided such that the instructions can be accessed from within the cache. This provides fast access of the instructions, but has the disadvantage of being a reactive mechanism, which makes autonomous decisions on which instruction to store based solely on the history of the instructions or instruction addresses being requested by the processor. To mitigate this disadvantage, caches are often equipped with complex prediction logic with the goal of maximizing the probability of keeping the requested instructions in its local store. As a consequence, such cache devices are very power hungry. This can be a particular disadvantage for lengthy programs having many stored instructions.

An alternative is to buffer the instructions prior to use in a FIFO buffer. This is cheaper than a cache, but has less flexibility. This lack of flexibility means that instructions have to be moved more often, which costs power and can also lead to stalling in the processor when an instruction is not available at the appropriate time.

Many of the above solutions are specific to particular architectures, so that a new architecture needs to be designed.

Thus, a structured control instruction fetch unit solving the aforementioned problems is desired.

SUMMARY OF THE INVENTION

The structured control instruction fetch unit is a structured instruction stream controller that processes expand (XP), expand register indirect (XPR), loop (LOOP), and break (BRK) instructions for structured control. The fetch unit processes stop bits, which mark the end of instruction blocks. Any instruction can be marked with a stop bit to indicate that it is the last one in an instruction block. All instructions are encoded with a predicate to reduce the use of control instructions and to simplify the control. A control stack guides instruction fetching by storing return addresses, loop block addresses, loop predicates, and loop counters. Control instructions and stop bits manage operation of the control stack. An instruction unit feeds execution units and includes a set-associative instruction cache, a control stack, an instruction buffer that decouples instruction fetching from execution, instruction decoders, and program counter (PC) control logic.

These and other features of the present invention will become readily apparent upon further review of the following specification and drawings.

BRIEF DESCRIPTION OF THE DRAWINGS

FIG. 5A is a schematic diagram showing the A (return address) and L (loop) entries on the control stack in a structured control instruction fetch unit according to the present invention.

FIG. 5B is a schematic diagram showing the insertion of an address entry on the address stack in a structured control instruction fetch unit according to the present invention.

FIG. 5C is a schematic diagram showing the insertion of a loop block address on to the address stack and the operation of the loop counter being pushed on to the counter stack in a structured control instruction fetch unit according to the present invention.

Similar reference characters denote corresponding features consistently throughout the attached drawings.

DETAILED DESCRIPTION OF THE PREFERRED EMBODIMENTS

Figure 1:
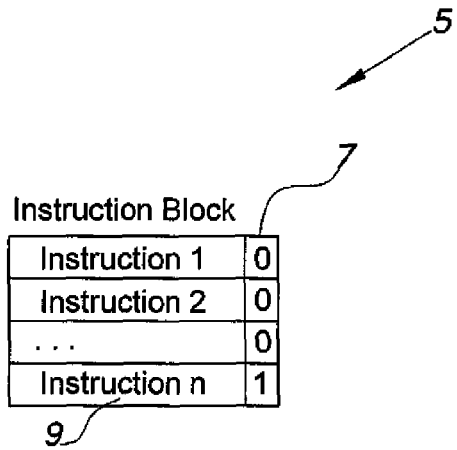
FIG. 1 is a schematic diagram of an instruction block in a structured control instruction fetch unit according to the present invention, the block having n instructions, where each instruction has a stop bit and the stop bit of the last instruction is set to 1 to mark the end of the instruction block.
Figure 7:
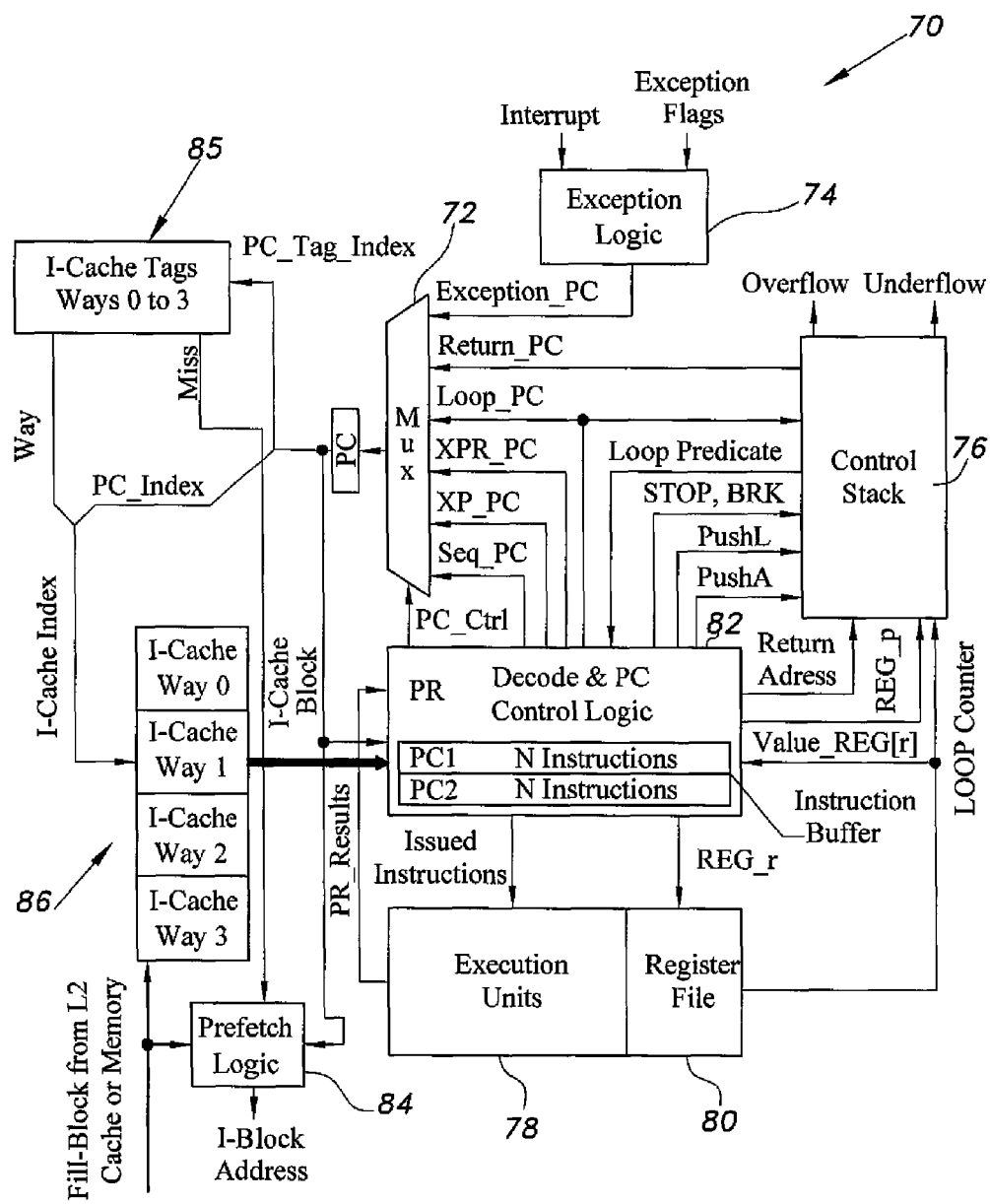
FIG. 7 is a block diagram showing an instruction unit including a set-associative instruction cache (I-Cache), a control stack, an instruction decode, and PC control logic with an instruction buffer in a structured control instruction fetch unit according to the present invention.

The structured control instruction fetch unit 70 (as shown in FIG. 7) is a structured instruction stream controller that processes expand (XP), expand register indirect (XPR), loop (LOOP), and break (BRK) instructions (shown as 20 in FIG. 2) for structured control. The fetch unit 70 processes stop bits, which mark the end of instruction blocks. As shown in FIG. 1, any instruction 9 can be marked with a stop bit 7 to indicate that it is the last one in an instruction block 5. A structured instruction set architecture is defined that includes the fetch unit 70 and the aforementioned instructions, which enable the formation of instruction blocks that correspond directly to the blocks of a high-level, block-structured programming language. This architecture obviates the need for jump or branch instructions. All instruction blocks are terminated with stop bits, which simplify implementation.

All instructions are encoded or constructed with a predicate (see the $p^3$ field in FIG. 2) to reduce the use of control instructions and to simplify the control. A control stack 76 (shown in FIG. 7) utilizes a stack control logic module 62 (shown in FIG. 6) to guide instruction fetching by storing return addresses, loop block addresses, loop predicates, and loop counters. Control instructions and stop bits manage operation of the control stack. An instruction unit 82 feeds execution units 78 and includes a set-associative instruction cache, a control stack, an instruction buffer that decouples instruction fetching from execution, instruction decoders, and program counter (PC) control logic.

As shown in FIG. 1, an instruction block 5 is defined as a sequence of instructions 9 that terminates with a stop bit 7. The first instruction is the target of a control instruction that initiates the execution of the instruction block 5. The last instruction is marked with a stop bit that is turned on (set to 1) to signal the end of the block. Each instruction has a stop bit that indicates whether it is the last instruction in a block. The stop bit is used to terminate the fetching of an instruction block. Any number of control instructions may appear inside an instruction block that will transfer control to other instruction blocks.

Figure 2:
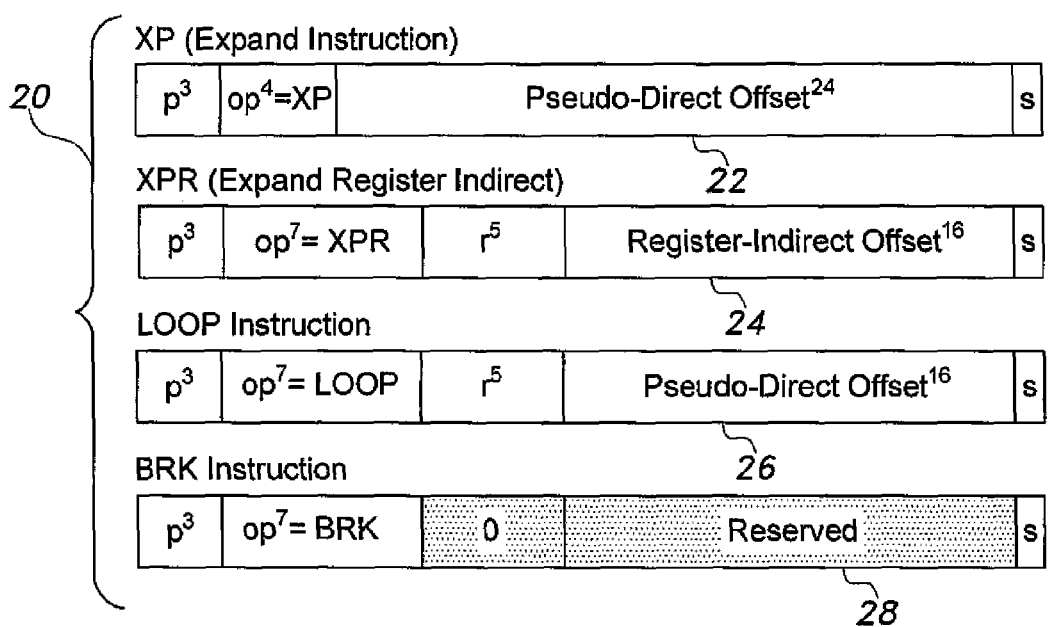
FIG. 2 is a schematic diagram showing the structured control instruction format for a structured control instruction fetch unit according to the present invention, the instruction format including a qualifying predicate field p and a stop bits.

As shown in FIG. 2, the format of control is of fixed length. In the present structured control instruction fetch unit 70, all instructions have a fixed 32-bit width. Instructions have a predicate, and include a 3-bit qualifying predicate field $p^3$ at the beginning of each instruction. A special stop bit s is defined as part of the instruction format, and is used to mark the end of an instruction block.

The XP (Expand Instruction) is a control instruction used to expand an instruction block. The target instruction block is expanded until the stop bit of the target block is reached. Nested block expansion is allowed.

The address of the target instruction block is encoded as a 24-bit XP Instruction pseudo-direct offset 22 in the instruction format. The 24-bit XP Instruction Pseudo-direct offset 22 is concatenated with the upper address bits of the program counter to compute the target instruction block address.

With respect to predication, all instructions are predicated. The XP instruction is predicated to expand a target instruction block conditionally. The preset structured control instruction fetch unit 70 defines eight qualifying predicate registers, named p0 through p7. If a qualifying predicate register (p) has a zero value, either the predicated instruction is dropped from the pipeline or its computed result is not written back. If the qualifying predicate is not specified, it defaults to (p0), which is always true and used for unconditional instructions.

The stop bit 7 marks the end of an instruction block 5. If an XP instruction is marked with a hash symbol (#), its stop bit is set, indicating that it is a conditional branch with no return. Otherwise, it is a conditional branch with a return address. There is no return instruction. The stop bit that marks the end of an instruction block is equivalent to a return instruction. Having instruction blocks marked with a stop bit 7 guides the fetch unit 70 to terminate the fetching of an instruction block.

As shown in FIG. 2, the format of the XPR (Expand Register Indirect) instruction includes a 3-bit predicate $p^3$, a seven-bit opcode ($op^7$=XPR), a five-bit register field $r^5$, and a sixteen-bit Expand Register Indirect Register-Indirect Offset field 24. The XPR instruction is used for the indirect expansion of an instruction block. The address of the target block is computed as the bitwise-OR of the value of register r and the 16-bit unsigned offset. Bitwise-OR (not addition) is used to compute the indirect instruction block address. Either the least significant bits of register r can be made zero, or the 16-bit offset can be encoded as zero, according to software requirements.

Figure 3:
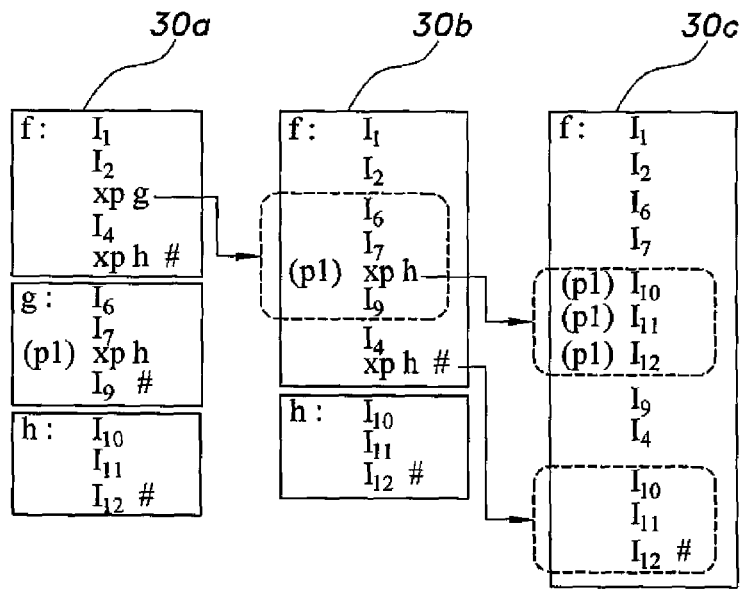
FIG. 3 is a schematic diagram showing the expansion of instruction blocks within other blocks to enlarge their size and improve instruction streaming a structured control instruction fetch unit according to the present invention.

With respect to enlarging instruction blocks, compilers can expand instruction blocks to enlarge their size and improve instruction streaming. FIG. 3, segment 30a shows three instruction blocks labeled f, g, and h, each marked with a stop bit. The assembly language syntax uses the hash symbol (#) to indicate block termination. Block f expands blocks g and h. Block g expands block h if (p1) is true, while block h expands nothing. Block h is called a leaf block because it contains no control instruction. Non-control instructions are labeled as: $I_1, I_2, \ldots, I_{12}$. Segment 30b shows the same series of instructions as segment 30a after inline expansion of block g within block f. The xp g instruction in segment 30a has been eliminated and replaced with the instructions of block g, and the stop bit of the last instruction in block g of segment 30a, $I_9$, is removed in segment 30b. This expansion works best for short instruction blocks. It is avoided for recursive instruction blocks.

In segment 30c, there are two expansions of block h within block f. The first expansion is conditional, while the second one is unconditional. The conditional expansion uses predication to predicate all instructions of block h with (p1). This approach works best if all instructions of block h are unconditional. Otherwise, additional instructions should be inserted to update the qualifying predicates. This expansion should also be avoided for recursive instruction blocks.

As shown in FIG. 2, the format of the LOOP instruction includes a sixteen-bit LOOP instruction Pseudo-Direct Offset 26, and expands counter-controlled and conditional loops. The value of five-bit register r specifies a count n of loop iterates. The LOOP instruction expands the loop block repeatedly at most n iterations as long as the value of the qualifying predicate (p) is non-zero. The LOOP instruction does not modify the value of register r. Instead, it copies and decrements the counter n on the control stack.

Figures 4A, 4B:
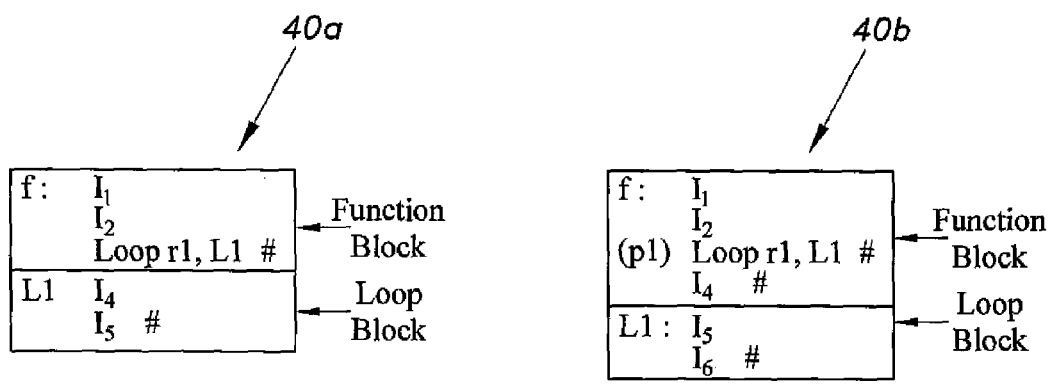
FIG. 4A is a schematic diagram showing a loop and stop block of instructions in a structured control instruction fetch unit according to the present invention.
FIG. 4B is a schematic diagram showing a loop and continue block of instructions in a structured control instruction fetch unit according to the present invention.

FIGS. 4A and 4B show example 40a and 40b, respectively, of LOOP instructions and blocks. The 16-bit offset in the instruction format is concatenated with the upper address bits of the program counter to compute the loop block address. The asserted stop bit (#) provides a simple solution to detect the end of a loop block.

Like any other instruction, the LOOP instruction has a stop bit 7 to control the flow of instructions. Exemplary loop&stop 40a has the stop bit 7 of the LOOP instruction asserted. The LOOP instruction expands the loop block repeatedly, and then terminates the execution of the outer block. On the other hand, exemplary loop&continue 40b includes a LOOP instruction where the stop bit is not marked, as shown in FIG. 4B. The loop block is expanded repeatedly, and then instruction flow continues in the outer block at the return address.

Additionally, FIG. 2 shows the format of the BRK (break) instruction, which is used for the conditional termination of a function block or a loop block. The BRK instruction includes a predicate $p^3$, opcode $op^7$, hard-coded five bits of 0's followed by a sixteen-bit reserved field 28 and the "s" bit (stop bit). If executed within a function block, the rest of the block is skipped and execution resumes at the return address. If executed within a loop block, the loop terminates prematurely. Since the BRK instruction is predicated, its effect depends on the value of a qualifying predicate (p). Only two uses of the BRK instruction are defined. Additional uses are reserved for future variations, such as breaking from multiple nested blocks, multiple nested loops, or terminating the execution of a thread.

The control stack is a high-speed buffer implemented in fetch unit 70 to control the instruction flow. FIG. 5A shows two types of control stack entries 50. The A entry specifies a return address, while the L entry specifies a loop entry that stores a qualifying predicate, a loop block address, and a loop counter. The L entry occupies twice the storage space of an A entry because of the loop counter. The control stack is split into two parts to simplify the implementation. The address stack stores commands and instruction addresses, while the counter stack stores loop counters only.

Initially, the control stack is empty. The XP L1 instruction pushes an A entry on exemplary address stack 52, as shown in FIG. 5B. The A entry stores the address of the next instruction (return address of XP L1). The A entry is pushed if the XP instruction is not marked with a stop bit (does not appear at the end of an instruction block). However, there is no A entry and no return address for a control instruction appearing at the end of an instruction block, such as XP L2#.

The LOOP instruction can push at most two entries on the control stack. The A entry specifies the loop return address. This entry is pushed whenever the LOOP instruction is not marked with a stop bit. The L entry is pushed next to specify the loop qualifying predicate, the loop block address, and the loop counter, which is the decremented value of register r5. As shown in FIG. 5C, the loop block address L3 is pushed on the address stack 54, while the loop counter is pushed on the counter stack 55. The two top pointers are adjusted accordingly. The exemplary operation of the counter-controlled loop shown in FIG. 5C specifies the loop block starting at L3 and terminating with a stop bit. When the last instruction of L3 is fetched under guidance from stack control 62, the fetch unit detects its stop bit. Since the top entry of the control stack is a loop, the loop counter interfacing with counter stack 55 is checked for loop termination. If greater than one, then control is transferred to the loop block address at L3, and the loop counter is decremented on the counter stack 55. Just before expanding the last iteration, the control logic of stack control 62 detects the counter value 1 and pops the L entry and corresponding counter off the stack. The top control now points to the next A entry. When completing the last iteration, the A entry is popped and control is transferred to the loop return address.

The value of the qualifying predicate p is also examined at the beginning of each loop iteration. If zero, the loop terminates prematurely, regardless of the loop counter value. However, since predicate p0 is hardwired to 1 (always true), the LOOP instruction of FIG. 5C is counter-controlled only.

Figure 6:
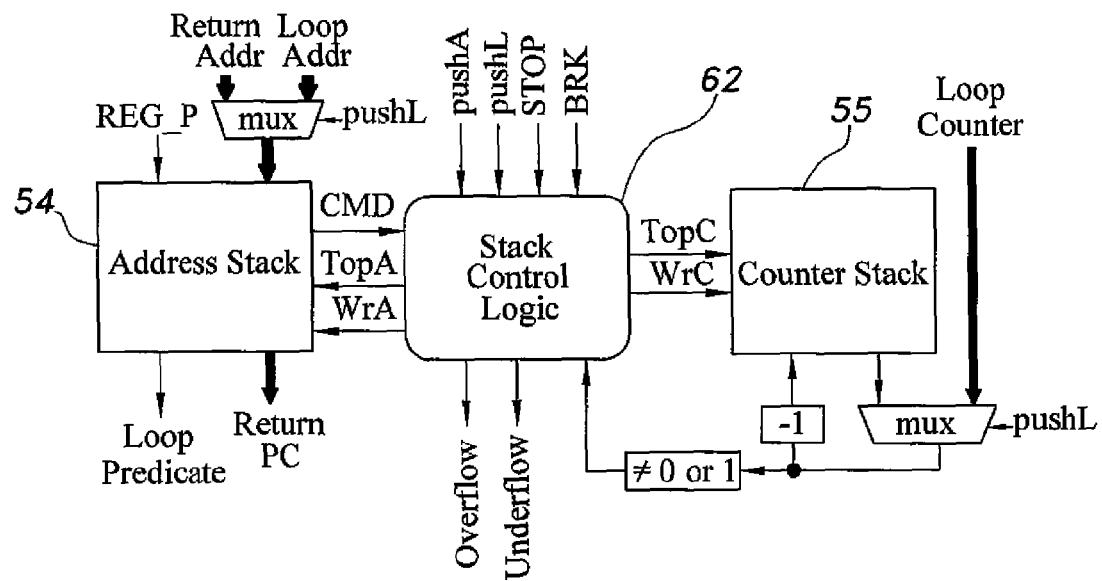
FIG. 6 is a schematic diagram of the control stack, including the address stack, counter stack, and stack control logic, in a structured control instruction fetch unit according to the present invention.

Additional details of the control stack, including the stack controller 62, the address stack 54, and the counter stack 55 are shown in FIG. 6. The address stack 54 stores return addresses and loop block addresses, along with their qualifying predicates. The counter stack 55 stores loop counters only. The stack controller 62 receives four control signals for controlling its internal operation and performs the requisite stack control logic. The PushA signal pushes an Address entry on the address stack. The PushL signal pushes a Loop entry on the address and counter stacks. The STOP signal corresponds to a stop bit that appears at the end of an instruction. The BRK signal corresponds to a break instruction.

The Stack Control logic of the stack controller 62 also examines the type of entries (CMD signal) on top of the address stack (whether A or L), and detects loop termination by examining the current value of the loop counter. Stack control internally stores and outputs two signals, TopA and TopC, which point to the top of the address stack and counter stack, respectively. Stack control outputs WrA and WrC write enable signals that enable the simultaneous writing of the address and counter stacks. The Stack Control logic also detects stack overflow and underflow and outputs their control signals. The address stack outputs the Loop Predicate (for an L entry) and Return Address on top of the stack, as shown in FIG. 6.

The PushA control signal pushes an A entry on the Address Stack only. This can be the return address of an XP or LOOP instruction, if its stop bit is not asserted. Otherwise, no return address is pushed. The TopA pointer is updated and the WrA signal enables the writing of an A entry.

The PushL control signal pushes an L entry on the address and counter stacks if the loop counter value is greater than 1 and the qualifying predicate value is nonzero. Otherwise, there is no need for the L entry. The top control updates the TopA and TopC pointers and enables the writing of the address and counter stacks using the WrA and WrC signals. The loop counter is decremented and then stored on the counter stack if its value is greater than 1.

The STOP control signal is used when the end of an instruction block is reached. The STOP signal indicates block termination. The program counter (PC register) is updated according to Return_PC Address. If an A entry appears on top of the address stack, it is popped. On the other hand, if an L entry appears on top of the address stack, the loop counter is decremented on the counter stack (WrC signal is asserted). If the loop counter value is 1, indicating the last iteration, then the L entry and counter are popped (TopA and TopC pointers are updated). If the loop qualifying predicate value is zero, then the L entry is also popped to terminate the loop prematurely.

The BRK control signal is associated with a break instruction. The present disclosure describes only two effects: breaking from an instruction block, and breaking from a loop. Other effects and variations are reserved for future use. If the top entry is an A entry, then its address is the Return_PC address and the entry is popped. If the top entry is an L entry, then this entry is popped and the next entry is examined. If the next entry is an A entry, then its address is the Return_PC address and the A entry is popped as well. If the next entry is a second L entry, then its address is the Return_PC address and its counter is decremented. If the counter of the second L entry is 1, then the second L entry is popped as well. In all cases, the PC register is updated according to the Return_PC address.

The BRK signal is also useful for speculative control. A fetch unit can expand a conditional instruction block or loop speculatively without testing the value of its qualifying predicate (p). The conditional block is marked with (p), and its instructions are not committed until the value of qualifying predicate is computed. If the value of (p) turns out to be true, then the control speculation is correct. Otherwise, the BRK control signal is used to break the fetching of instructions from the conditional block. The program counter is updated according to the Return_PC Address.

Regarding control stack overflow, the control stack has a fixed number of address and counter entries, according to implementation. Typically, a small number of entries are needed per hardware thread. However, recursive block expansion can overflow the address stack. Overflow occurs when the address or counter stack becomes full and there is a demand to push additional entries by the PushA or PushL control signals. It is a hardware exception that is handled by either terminating the execution of the thread, or by spilling some entries to a predefined memory region. Only the top entries appear on the control stack, while the bottom entries can be stored in memory.

Underflow occurs when the address stack becomes empty and there is a demand to pop an entry by the STOP or BRK control signals. If the control stack is memory-mapped and there are saved entries in memory, then these entries are restored onto the control stack. Otherwise, stack underflow indicates the termination of a thread.

The schematic diagram of instruction unit 70 is shown in FIG. 7. The stack control logic (stack controller) 62 manages the control stack 76. An I-Cache Block 86 including N instructions is fetched each cycle, where N is implementation specific. The fetched instructions are aligned on the I-cache block boundary. The fetched instructions are decoded and inserted into an instruction buffer, although not all of them might be needed. The instance value of the PC register is also associated with each block of instructions in the instruction buffer. Although only two I-cache blocks are depicted in FIG. 7, the number of blocks in the instruction buffer is implementation specific.

The Decode logic examines the opcodes of all fetched instructions in parallel, detecting control instructions and stop bits. If none of the pre-fetched instructions is a control instruction and none of them has its stop bit set, then the I-cache block address is incremented to fetch the next block of N instructions. The SeqPC signal from the Decode and PC Control Logic of instruction unit 82 specifies the address of the next I-cache block, and the PC control logic selects the Seq_PC input of the multiplexer 72.

Furthermore, the Decode logic identifies the first control instruction or the first instruction marked with a stop bit, whichever appears first among the fetched instructions. If a control instruction appears first, then its effect will take place. If this control instruction is expand (XP), register-indirect expand (XPR), or LOOP, then its target block address (XP_PC, XPR_PC, or LOOP_PC) and its Return Address are computed. The Return Address is the address of the next instruction appearing after XP, XPR, or LOOP, if these instructions are not marked with a stop bit.

The PC register is updated according to the target address (XP_PC, XPR_PC, or LOOP_PC). The control stack pushes Return Address (PushA signal), Loop entry (PushL signal), or both, according to the control instruction and its associated stop bit. The value of register r (Value_REG[r]) from Register File 80 is read and pushed on the counter stack as a LOOP Counter. It can also serve to compute the target address of the XPR instruction (XPR_PC), as shown in FIG. 7.

If the stop bit of a control instruction is set, then No Return Address is pushed on the control stack. The PC register is updated according to the target address only, without asserting the PushA signal.

If a non-control instruction marked with a stop bit is first identified among a block of instructions, then the PC register is updated according to the control stack Return_PC address. The STOP control signal is asserted to update the top entry of the control stack.

Control instructions are predicated, and their effects depend on the values of qualifying predicates. The PR register in the PC Control Logic stores the values of all predicate registers p1 to p7, where p0 is hardwired to 1. If a control instruction is predicated with (p), its value is computed before updating the PC register. This is especially useful when a sequence of XP instructions are predicated with different qualifying predicates. Only one target instruction block is expanded, and the rest are skipped. The present structured control instruction fetch unit advocates non-speculative instruction stream control, in which predicated control instructions do not take effect until their qualifying predicates are computed. Non-speculative control might delay the expansion of predicated instruction blocks, but avoids the complexity and overhead of speculative control. Compilers can eliminate predicated XP instructions by expanding their target instruction blocks inline, as illustrated in segment 30c, shown in FIG. 3.

If a BRK instruction is first identified among instructions and its qualifying predicate is true, then the BRK control signal is sent to the control stack and the PC register is updated according to the return address (Return_PC). The BRK control signal is used to terminate instruction blocks and loop blocks prematurely, and updates the top entry of the Control Stack.

The I-Cache, shown in FIG. 7, is a conventional set-associative cache. The number of ways can vary according to implementation. The I-Cache Tags 85 are examined for a given set at PC_index to produce the Way. The Way is concatenated with the PC_index to produce the I-Cache Index. The I-Cache Index is used to fetch the I-Cache Block. The lookup of the I-Cache Tags and the indexing of the I-Cache are done sequentially during the same cycle. No way-prediction is assumed.

In the event of I-Cache miss, the PC register address is sent to the Pre-fetch Logic 84 to pre-fetch the instruction block. As a block is transferred from the L2 Cache or Memory to the I-Cache, the Pre-fetch Logic 84 also examines its instructions. If control instructions are detected, the Pre-fetch Logic computes their target addresses and pre-fetch their target blocks. The Pre-fetch Logic also examines stop bits to decide whether an instruction block spans on one or multiple I-Cache blocks.

Thread termination is detected when the last instruction in an instruction block is fetched and there is no Return PC address on the control stack. The Control Stack generates an Underflow exception. This exception flag is input to the Exception Logic 74 to output the appropriate Exception_PC. The Exception Logic can detect many exception flags and output different Exception_PCs.

It should be understood by one of ordinary skill in the art that embodiments of the present method can comprise software or firmware code executing on a computer, a microcontroller, a microprocessor, or a DSP processor; state machines implemented in application specific or programmable logic; or numerous other forms. Moreover, the structured control instruction fetch unit can be provided as a computer program, which includes a non-transitory machine-readable medium having stored thereon instructions that can be used to program a computer (or other electronic devices) to perform the processes described herein. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

It is to be understood that the present invention is not limited to the embodiments described above, but encompasses any and all embodiments within the scope of the following claims.

I claim:

1. A structured control instruction fetch unit, comprising:
a stack controller;
a control stack having an address stack and a counter stack, the stack controller managing the control stack; and
execution units in operable communication with the control stack;
wherein the structured control instruction fetch unit is configured for processing fixed format block structured instructions, the fixed format block structured instructions having a control instruction including a predicate field, an opcode field, an offset field, and a stop field, the instructions being processes via the control stack, the stack controller feeding the fixed format block structured instructions to the execution units, the execution units executing blocks of the instructions based on the content of the predicate, opcode, offset, and stop fields, the execution units terminating execution of the instruction blocks upon reading stop bits in the stop fields; and wherein the instruction blocks are executed by the execution units in direct correspondence with blocks of high-level code, the structured control instruction fetch unit implementing loops and nested block expansions without the necessity of low level branch and jump instructions.

2. The structured control instruction fetch unit according to claim 1, wherein said stack controller further comprises means for storing return addresses, loop block addresses, loop predicates, and loop counters, thereby guiding instruction fetching of the structured control instruction fetch unit.

3. The structured control instruction fetch unit according to claim 2, further comprising means for recursively and non-recursively expanding said instruction blocks.

4. The structured control instruction fetch unit according to claim 3, wherein said instruction block has a first instruction and a last instruction, the first instruction being a target of said control instruction and the last instruction of said instruction block including an asserted stop bit in said stop field.

5. The structured control instruction fetch unit according to claim 4, wherein said stack controller further comprises:
means for placing an address of a LOOP control instruction on said address stack;
means for placing a loop count defined by said LOOP control instruction on said counter stack;
means for executing a block of instructions pointed to by the LOOP address on said address stack a number of times indicated by the loop count on said counter stack; and
means for detecting the end of said loop block of instructions based on assertion of said stop bit.

6. The structured control instruction fetch unit according to claim 5, wherein said stack controller further comprises:
means for terminating an outer block of instructions containing said LOOP control instruction based on assertion of a stop bit in said LOOP control instruction; and
means for continuing said outer block of instructions containing said LOOP control instruction based on non-assertion of said stop bit in said LOOP control instruction.

7. The structured control instruction fetch unit according to claim 6, wherein said stack controller further comprises:
means for skipping instructions within a functional block of instructions based on execution of a BRK control instruction within the functional block of instructions; and
means for premature termination of said loop block of instructions based on execution of the BRK control instruction within said loop block of instructions.

8. The structured control instruction fetch unit according to claim 7, wherein said means for recursively and non-recursively expanding said instruction blocks further comprises means for determining a target instruction block address based on a pseudo-direct offset field in an XP (Expand) said control instruction.

9. The structured control instruction fetch unit according to claim 8, wherein said means for recursively and non-recursively expanding said instruction blocks further comprises means for determining a target instruction block address based on a register field and a register-indirect offset field in an XPR (Expand Register Indirect) control instruction.

10. The structured control instruction fetch unit according to claim 9, further comprising means for unconditionally executing said control instruction based on a hard-coded default value pointed to by said predicate field.

11. The structured control instruction fetch unit according to claim 10, further comprising means for conditionally executing said control instruction based on a programmer-determined value pointed to by said predicate field.

12. The structured control instruction fetch unit according to claim 11, further comprising means for placing said return address associated with said control instruction on said address stack.

13. The structured control instruction fetch unit according to claim 11, further comprising means for placing on said address stack a loop return address, a loop block address, and a loop predicate associated with said LOOP control instruction.

14. The structured control instruction fetch unit according to claim 13, further comprising means for speculatively expanding a conditional instruction block, including:
means for marking the conditional instruction block with a programmer-specified value in said predicate field; and
means for placing a BRK control instruction in line within the conditional instruction block as an alternative instruction executing when said programmer-specified predicate is not true.

15. The structured control instruction fetch unit according to claim 13, wherein said means for determining said target instruction block address based on said pseudo-direct offset field in said XP (Expand) control instruction further comprises means for concatenating contents of said pseudo-direct offset field with upper address bits of a program counter maintained by said fetch unit, thereby computing said target instruction block address.

16. The structured control instruction fetch unit according to claim 13, wherein said means for determining said target instruction block address based on said register field and said register-indirect offset field in said XPR (Expand Register Indirect) control instruction further comprises means for performing a bit-wise logical OR operation using contents of said register-indirect offset field with contents of said register field, thereby computing said target instruction block address.

17. The structured control instruction fetch unit according to claim 13, wherein memory management of said block instructions includes a set associative cache memory in operable communication with a decode and program counter control logic portion of said structured control instruction fetch unit.

* * * * *